United States Patent [19]
Schneider et al.

[11] Patent Number: 4,806,005
[45] Date of Patent: Feb. 21, 1989

[54] SPOTTING SYSTEM FOR BINOCULARS AND TELESCOPES

[76] Inventors: Richard T. Schneider, 17 Alachua Highlands, Alachua, Fla. 32615; Richard H. Keates, 264 N. Drexel Ave., Columbus, Ohio 43209

[21] Appl. No.: 32,778
[22] Filed: Mar. 31, 1987
[51] Int. Cl.[4] .................. G02B 23/14; G02B 15/04
[52] U.S. Cl. .................. 350/557; 350/545; 350/559
[58] Field of Search .............. 350/537, 541–542, 350/545, 557–559, 561–562, 546–556

[56] References Cited

U.S. PATENT DOCUMENTS

| | | | |
|---|---|---|---|
| 841,262 | 1/1907 | Martin | 350/559 |
| 2,578,013 | 12/1951 | Monk | 350/545 |
| 3,043,181 | 7/1962 | Brown et al. | 350/561 |
| 3,152,214 | 10/1964 | Korones et al. | 350/557 |
| 3,468,597 | 9/1969 | Jones | 350/557 |
| 4,465,347 | 8/1984 | Task et al. | 350/558 |
| 4,641,931 | 2/1987 | Loy | 350/558 |
| 4,669,833 | 6/1987 | Mise | 350/558 |

OTHER PUBLICATIONS

Navaer, Handbook, "Navagational and Computing Viewfinder" Model VF-34, Navaer 10-10AH-508, 10-15-57.

Primary Examiner—William H. Punter
Attorney, Agent, or Firm—Bert J. Lewen

[57] ABSTRACT

An auxiliary spotting optical system for binoculars and telescopes includes an auxiliary objective lens proximate the principal objective lens, a principal magnification system field of view indicator and an image transfer arrangement between the field of view indicator and the ocular lens of the binocular to bridge the optical gap created between the image plane of the auxiliary objective lens and the focal plane of the ocular lens to create an optical system delivering a 1× magnification to an observer with normal eyesight. A movable mirror in the optical path of the principal magnification system and the spotting system determines which optical system is active. In its first position the mirror directs light passing through the auxiliary objective lens, the field of view indicator, the image transfer arrangement to the ocular lens, and blocks the principal magnification optical path. The viewer is afforded a wide field of view without significant magnification with an indication of the area encompassed in the principal magnification field of view. The user can move the binocular until the target is within the field of view indicator. Shifting the mirror to its second position breaks the light path through the spotting system and opens the principal magnification optical path, and the target appears magnified to the power of the principal magnification system.

16 Claims, 2 Drawing Sheets

SPOTTING SYSTEM FOR BINOCULARS AND TELESCOPES

BACKGROUND OF THE INVENTION

This invention relates to telescopes and binoculars, and more particularly pertains to a novel spotting system for such instruments which facilitates locating the target and which permits instantaneous shift to magnification of the target after it is located.

Binoculars are usually provided with magnifying capacities or power ranges of from 6× to 10× and at the latter magnifying power the field of view is fairly limited. Consequently, if one wants to locate a target, e.g., an airplane in the sky or a buoy at sea, it usually means sighting through the binocular and scanning the field of vision more or less randomly until the target is picked up. In some cases the approximate general location of the target can be ascertained with the naked eye; however, one is still faced with then having to locate the target through the binocular at the magnifying power. Since the field of view is limited, this can be a difficult task especially in those instances where the target is small or is moving.

A zoom lens arrangement could be employed. The lower power being used first to sight the target and the magnifying power thereafter increased as desired. To achieve the desired magnification takes time as the relative positions of the optical elements in the zoom lens arrangement are changed to effect magnification. During this time the target may have moved out of the field of view, necessitating relocation of the target. In addition zoom lenses, because of their relatively sophisticated and complex construction are expensive to manufacture, cannot stand up to rough handling and are susceptible to failure in severe or adverse use conditions. Further, such lenses are bulky and increase the weight as well as the cost of the binocular.

Accordingly, it is desirable to provide a spotting system for binoculars and telescopes which facilitates target location and which will permit instantaneous switching to the magnifying power once the target is spotted.

OBJECTS AND SUMMARY OF THE INVENTION

Among the several objects of the invention may be noted the provision of a novel spotting system for binoculars and telescopes which facilitates target location and magnification of the target.

Other objects and features of the invention will be in part apparent and in part pointed out hereinafter.

In accordance with the present invention, a binocular of conventional construction is provided with an auxiliary optics system to facilitate location of the target. The binocular's principal magnification optical system or path is essentially a principal objective lens of a certain power, prisms, and an ocular lens(es) of suitable power forming the eye piece. The auxiliary spotting optical system includes an auxiliary objective lens proximate to and in the plane of the principal objective lens. A transparent plate is positioned on the focal plane of the auxiliary objective lens and has a circle inscribed thereon or bears other indicia defining the field of view of the principal magnification system to the viewer. An image transfer arrangement between the transparent plate and ocular lens bridges the optical gap created between the image plane of the auxiliary objective lens and the focal plane of the ocular lens (of the principal system) in a way to provide a 1× magnification to an observer with normal eyesight.

A movable mirror is positioned in the optical path of the principal magnification system between the prisms and the ocular lens as well as in the optical path of the spotting system between the image transfer arrangement and the ocular lens. An actuation mechanism is provided to move the mirror from a first position in which it lies within the optical path of the spotting system and obstructs the optical path of the principal magnification system to a second position in which it disrupts the spotting system optical path and opens the optical path of the principal magnification system.

The user first sights through the binocular utilizing the spotting system and is afforded a wide field of view with substantially no magnification. The movable mirror is in its first position and the active light path is through the auxiliary objective lens, the transparent plate, and the image transfer arrangement, off the movable mirror and through the ocular lens to the eye. The field of view presented will include the principal magnification system field of view indicator carried on the transparent plate superimposed thereon. The user can move the binocular until the desired target is within the field indicator. The user can then shift the mirror into its second position thereby breaking the light path through the spotting system and the active light path is through the principal magnification system. The area in the field indicator will now appear in the user's view magnified to the power of the principal magnification system.

The invention accordingly comprises the construction hereinafter described, the scope of the invention being indicated in the claims.

DESCRIPTION OF THE DRAWINGS

In the accompanying drawings, in which several embodiments of the invention are illustrated.

Corresponding reference characters indicate corresponding parts throughout the several views of the drawings.

DETAILED DESCRIPTION OF THE INVENTION

Figure 1:
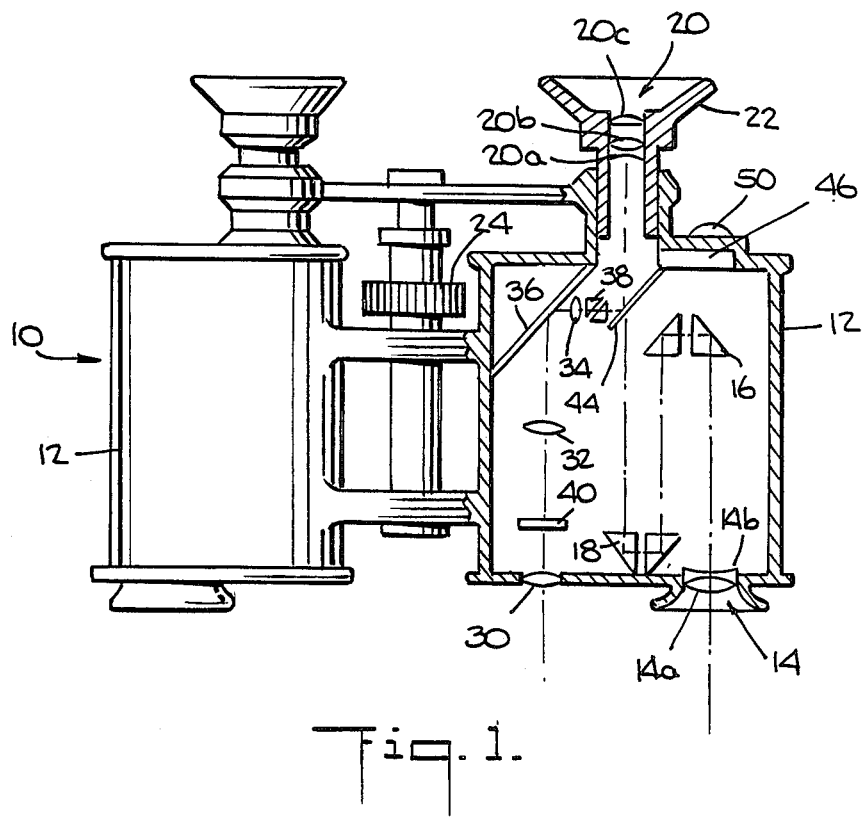
FIG. 1 is a partial sectional view of a conventional prism binocular in which the present invention is applied.

A binocular incorporating the subject invention is identified generally by the reference numeral 10 in FIG. 1. As will become apparent as the description proceeds, the spotting system of the present invention is adapted for use in a conventional prism binocular. For the sake of brevity only those elements of the binocular which are necessary for a full and clear understanding of the invention will be mentioned. In addition, it will be appreciated by those skilled in the art that the subject invention is adapted for use in a conventional telescope and the terms binocular and telescope are used interchangeably herein.

The prism binocular 10 includes two barrels 12 each of which house the principal magnification optics of the binocular. Light rays entering the binoculars pass through a principal objective lens 14, sets of prisms 16 and 18, and an ocular lens 20 mounted in eye piece 22 to the eye. The function of these elements is well known. Briefly, the principal objective lens 14, which may include lens elements 14a and 14b, forms a real inverted image of the target. The two sets of prisms 16 and 18 perform an inversion of the image in both the vertical and horizontal planes. The result is that after light rays have passed through the objective lens and both sets of prisms, the obtained real image portrays the original target faithfully. Since the real image formed is less than one focal length away from the ocular lens 20, the lens 20 acts as a magnifying glass and the eye sees an enlarged, erect, virtual image of the real image. The ocular lens 20 may be made up of a number of separate elements 20a, 20b and 20c, to correct spherical and chromatic aberrations. A central adjustment knob 24 permits the eye pieces to be moved in or out of their respective barrels to adjust the distances between the objective and ocular lenses. In some instruments, each eye piece may be adjusted independently of the other to allow for differences between the viewer's eyes.

Figure 2:
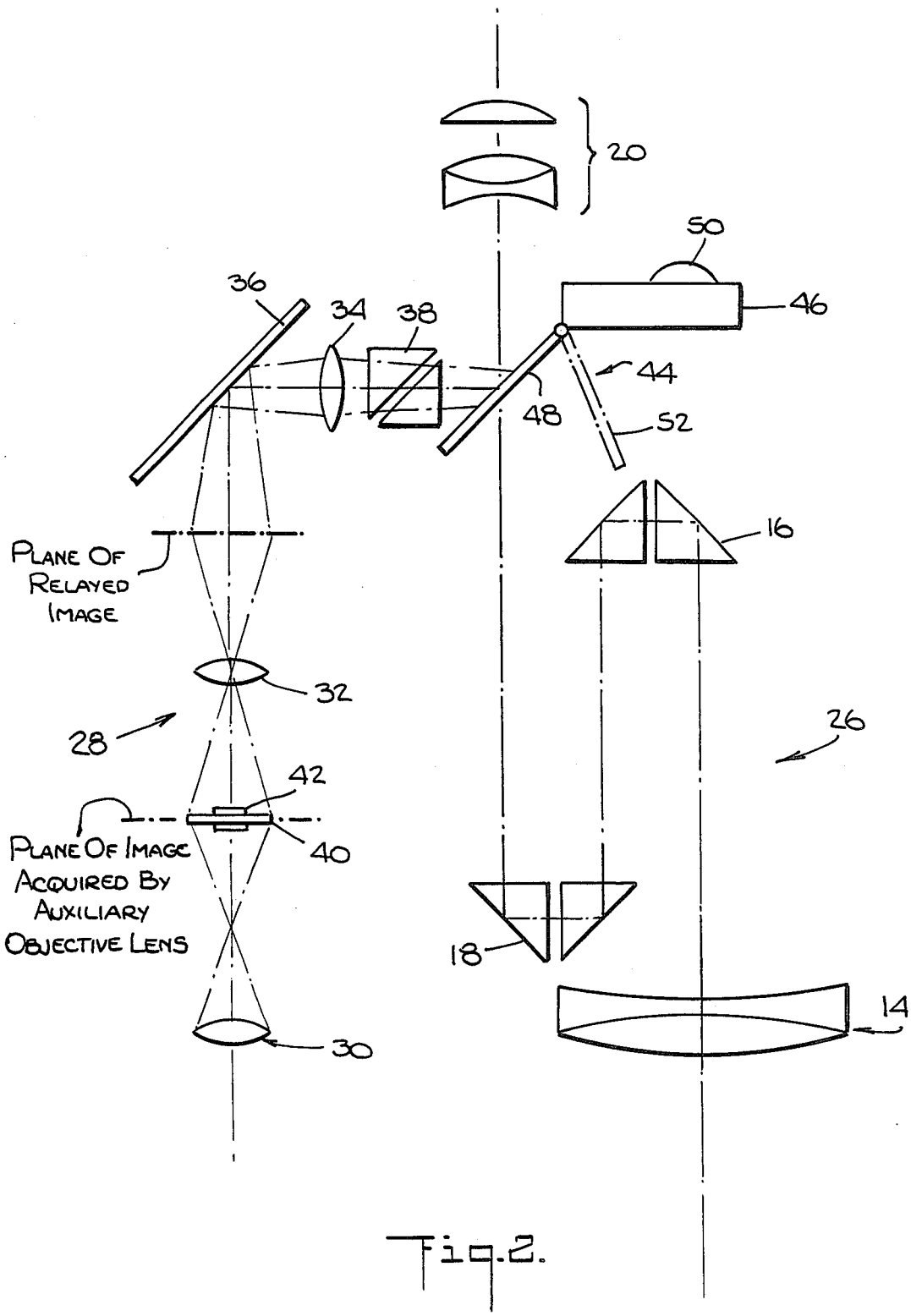
FIG. 2 is an enlarged schematic of the optics systems of the binocular of FIG. 1.

The present invention permits the user to sight through the ocular lens of the binocular at virtually no magnification by means of an auxiliary spotting system to locate the target and once the target is located, switch immediately to the principal magnifying optics system. The details of the construction of the spotting system and the system's interaction with the principal magnification system of the binoculars can be understood best with reference to FIG. 2, wherein the principal magnification optical system is identified generally by reference numeral 26 and includes the principal objective lens 14, prism sets 16 and 18, and ocular lens 20 which function in the manner described above.

The auxiliary spotting system 28 includes a auxiliary objective lens 30 of the same focal length as the ocular lens 20 mounted at the front of the binocular preferably in the same plane as and proximate the principal objective lens 14. The auxiliary objective lens 30 has a relatively small diameter as compared to the principal objective lens 14 and will be equal to or only slightly greater than the diameter of the ocular lens 20. The image by the auxiliary objective lens 30 will appear between one and two focal lengths (depending upon the distance to the target) behind said lens. Since the ocular lens 20 is in a relatively fixed position with respect to the lens 30 a gap exists between the image plane of the lens 30 and the focal plane of the ocular lens 20. An image transfer arrangement is therefore utilized to bridge this optical gap, and may include one or more lenses of a suitable focal length so as to produce a 1× magnification of the spotting system, comprising lens 30, the transfer lenses and the ocular lens 20. The focal length of the auxiliary lens 30 is equal to the focal length of lens 20. The lenses 32 and 34 are arranged so that the optical system composed of lenses 30, 32, 34 and 20 produces a 1× magnification to an observer with normal eyesight. A slight deviation from these criteria caused by the fact that the image of the auxiliary objective lens 30 might be at differing locations depending on the distance to the viewed target will have the effect that said target viewed through the spotting system will be slightly magnified; however this will not detract from the present invention.

Figure 3:
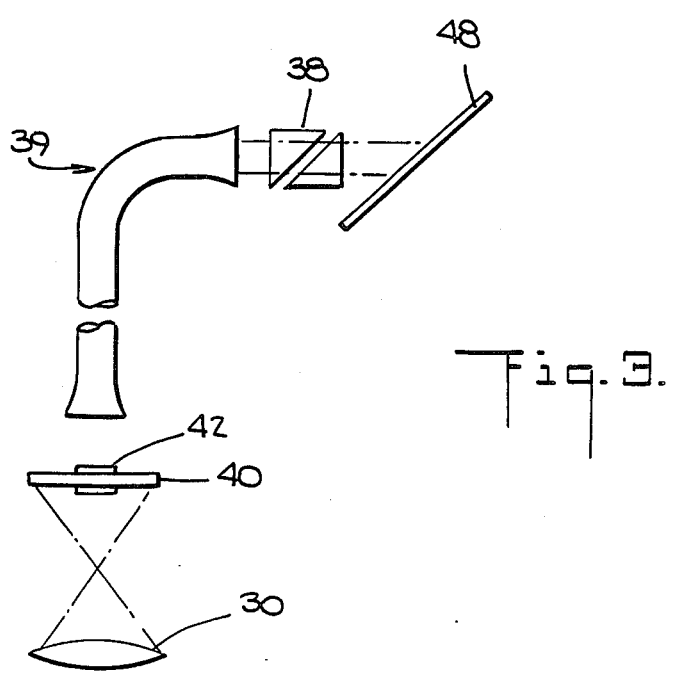
FIG. 3 is a schematic of an image transfer arrangement in accordance with an alternative embodiment of the present invention.

Due to space limitations which will affect the arrangement of parts within the binocular barrel 12, it may be impractical to use a single transfer lens. With continued reference to FIG. 2, a transfer lens arrangement is shown as comprising a first transfer lens 32 and a second transfer lens 34 with a mirror 36 positioned therebetween to reflect the light at a forty-five degree angle to assist in routing the light path of the spotting system to the ocular lens. The transfer lenses 32 and 34 will also invert the image and this can be rectified by a prism arrangement 38 which functions in a manner similar to the prism arrangement in the principal magnification system. It should also be understood that the image transfer arrangement could consist of a fiberoptics image conduit 39 (coherent fiberoptics bundle) in lieu of the transfer lenses 32 and 34, and mirror 36 as shown in FIG. 3.

A transparent plate 40 is positioned on the focal plane of the auxiliary objective lens 30. The plate 40 bears indicia 42 to indicate to one sighting through the spotting system the field of view at that instant of the principal magnifying system. The indicia may be simply a circle inscribed on the plate, a color tinted disk or other conventional means.

A means is provided to allow the user to switch from the spotting system to the principal magnification system almost instantaneously. The principal magnification system and the spotting system are configured so that a movable mirror 44 can be positioned in the light path of the principal magnification system between the prisms 18 and the ocular lens 20 and in the light path of the spotting system between the prisms 38 and the ocular lens 20.

An actuation mechanism 46 similar to one used in single lens reflex cameras is adapted to move the mirror 44 between first and second positions. With mirror 44 in its first position (48 in FIG. 2) it obstructs or blocks the light path through the principal magnifying system. The operating or active light path is through the spotting system, i.e., through the auxiliary objective lens 30, plate 38, transfer lenses 32 and 34, prisms 36, off mirror 44 to the ocular lens 20. In this configuration the user sighting through the binocular is afforded a wide field of view without much magnification. The field of view will include the principal field of view indicator to facilitate the location of the target. When the actuation mechanism is engaged, for example by pressing button 50, the mirror 44 moves into its second position (52 in FIG. 2) will break the optical path through the spotting system, and open the principal magnification optical path so it becomes the operating or active light path. The area seen in the field of view indicator in the spotting system will now appear in view magnified to the power of the principal magnification system.

As noted above the actuation mechanism may be of conventional construction well known to those skilled in the art. It may be push button actuated as shown in which case the movable mirror 44 is normally in its first position and will move to its second position when the actuation button is pressed and remain there as long as the button remains depressed. Alternatively, the movable mirror may normally rest in its second position, moving into the first position when the actuation button is depressed.

The spotting system discussed above need be provided in only one barrel of the binocular to the effective. Optionally, spotting systems can be provided in both barrels.

Some advantages of the present invention evident from the foregoing description include a spotting system for binoculars which facilitates target location and which will permit instantaneous magnification of the target once located.

In view of the above, it will be seen that the several objects of the invention are achieved and other advantageous results attained.

As various changes can be made in the above construction without departing from the scope of the invention, it is intended that all matter contained in the above description or shown in the accompanying drawings shall be interpreted as illustrative and not in a limiting sense.

What is claimed is:

1. A hand-held telescope comprising:
   (a) principal objective lens and an ocular lens defining a principal magnification optical path having a fixed magnification of from 6× to 10×;
   (b) an auxiliary objective lens; and
   (c) light diverting means comprising a mirror movable between a first and a second position; and
   (d) actuation means adapted to instantly displace said mirror from said first position to said second position and from said second position to said first position;
   said movable mirror in said first position reflecting light passing through said auxiliary objective lens onto the focal plane of said ocular lens to permit a substantially unmagnified view through said ocular lens and blocking said principal magnification optical path, and in said second position breaking said optical path through said auxiliary objective lens and opening said principal magnification optical path to permit the magnified target image to be viewed through said ocular lens.

2. The telescope as claimed in claim 1 further comprising a principal magnification optical path field of view indicator means situated between said auxiliary objective lens and said ocular lens, said field of view indicator means defining the area to be viewed through said principal magnification optical path when said optical path through said objective lens and said field of view indicator means is broken.

3. The telescope as claimed in claim 2 wherein said field of view indicator means comprises a transparent plate within the focal plane of said auxiliary objective lens and means on said plate for identifying the area encompassed by said principal magnification optical path.

4. The telescope as claimed in claim 3 wherein said identifying means is a circle inscribed on said plate.

5. The telescope as claimed in claim 3 wherein said identifying means is a transparent colored disk.

6. The telescope as claimed in claim 1 further including a transfer lens arrangement positioned intermediate said auxiliary objective lens and said ocular lens bridging the gap between the image plane of said auxiliary objective lens and the focal plane of said ocular lens to create an optical system delivering a 1× magnification to an observer with normal eyesight.

7. The telescope as claimed in claim 1 further including prisms in the optical path of said auxiliary objective lens and said ocular lens adapted to correct inversion of the image.

8. The telescope as claimed in claim 1 further including an image transfer arrangement comprising a fiber optics image conduit positioned intermediate said auxiliary objective lens and said ocular lens, bridging the gap between the image plane of said auxiliary objective lens and the focal plane of said ocular lens providing a 1× magnification to an observer with normal eyesight.

9. A spotting system for a hand-held telescope having a principal magnification optical path having a fixed magnification from 6× to 10× including a principal objective lens and ocular lens, said spotting system comprising:
   (a) an auxiliary objective lens proximate said principal objective lens;
   (b) a movable mirror; and
   (c) actuation means adapted to displace said mirror instantaneously between a first and a second position, said movable mirror in said first position reflecting light passing through said auxiliary objective lens onto the focal plane of said ocular lens to permit a substantially unmagnified view of a target image and blocking said principal magnification optical path, and in said second position breaking said optical path through said auxiliary objective lens and opening said principal magnification optical path to permit the target image to be viewed through said ocular lens.

10. The spotting system as claimed in claim 9 further comprising a principal magnification optical path field of view indicator means situated between said auxiliary objective lens and said ocular lens.

11. The spotting system as claimed in claim 10 wherein said field of view indicator means comprises a transparent plate within the focal plane of said auxiliary objective lens and means on said plate for identifying the field of view of said principal magnification optical path.

12. The spotting system as claimed in claim 11 wherein said identifying means is a circle inscribed on said plate.

13. The spotting system as claimed in claim 11 wherein said identifying means is a transparent colored disk.

14. The spotting system as claimed in claim 9 further including prisms in the optical path of said objective lens and said ocular lens adapted to correct inversion of the image.

15. The spotting system as claimed in claim 9 further including a transfer lens arrangement positioned intermediate said objective lens and said ocular lens bridging the gap between the image plane of said auxiliary objective lens and the focal plane of said ocular lens to create an optical system delivering a 1× magnification to an observer with normal eyesight.

16. The spotting system as claimed in claim 9 further including an image transfer arrangement comprising a fiber optic image conduit intermediate said auxiliary objective lens and said ocular lens, bridging the gap between the image plane of said objective lens and the focal plane of said ocular lens providing a 1× magnification to an observer with normal eyesight.

* * * * *